Patented Oct. 13, 1925.

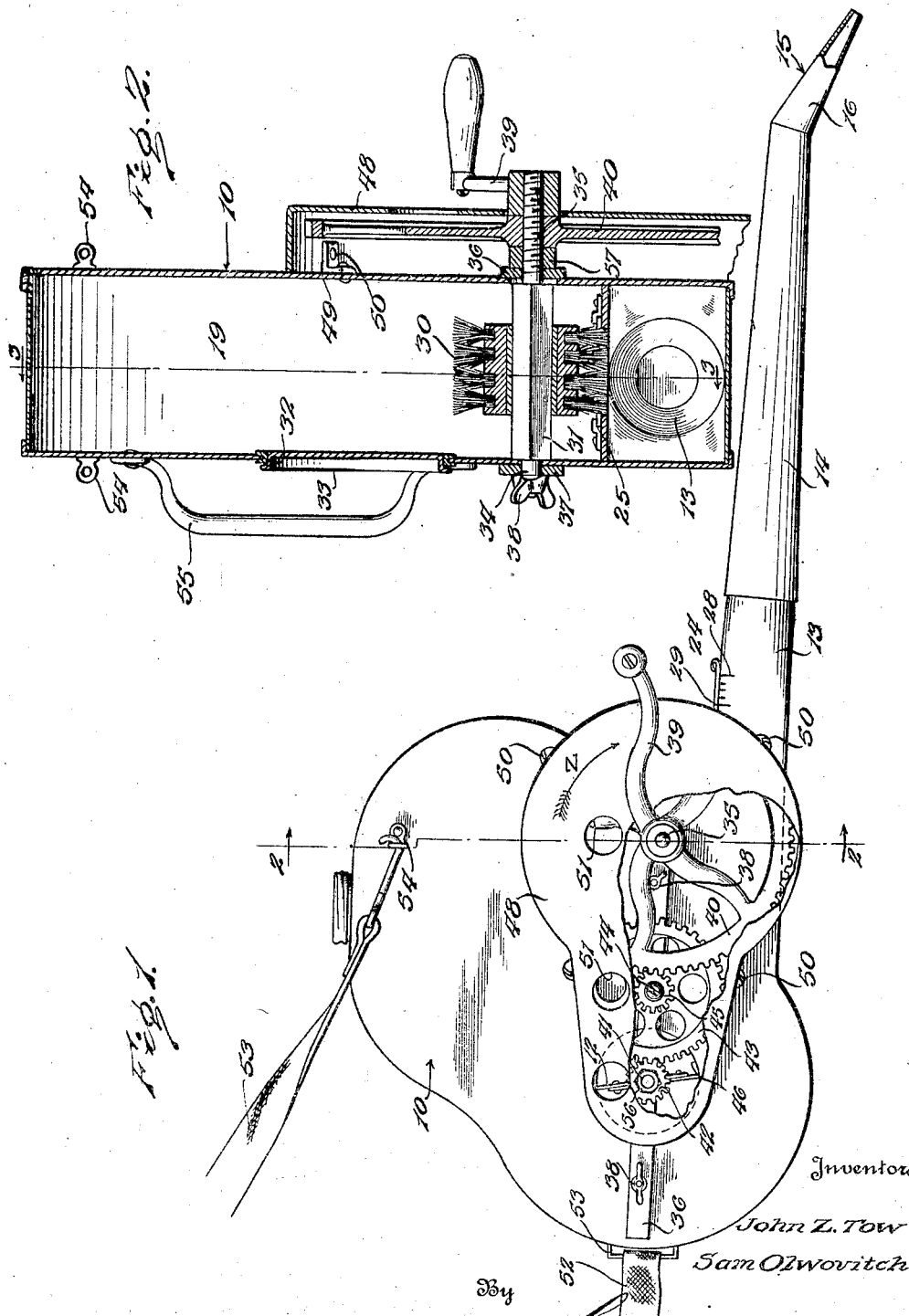

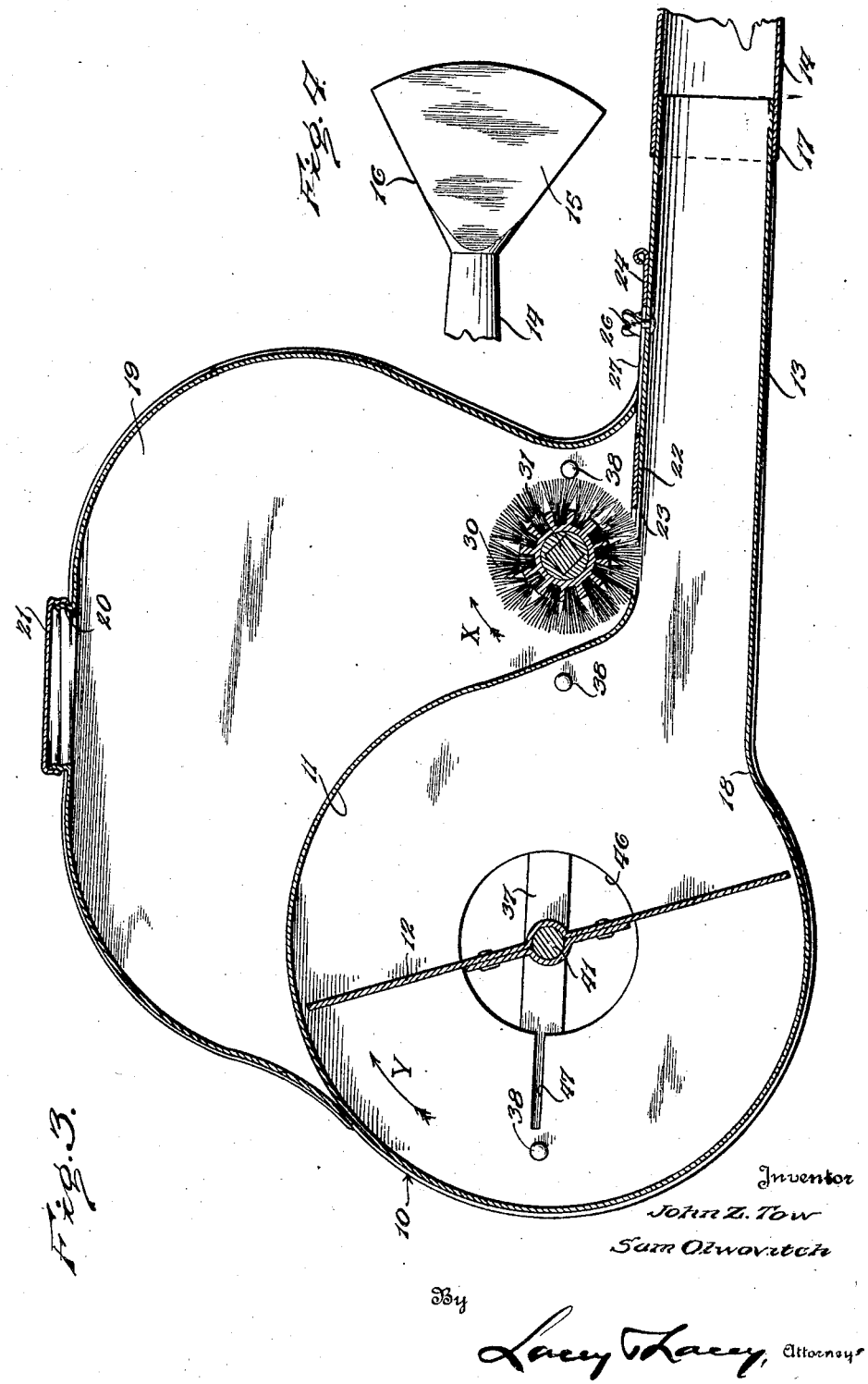

1,557,106

UNITED STATES PATENT OFFICE.

JOHN Z. TOW AND SAM OLWOVITCH, OF SPRINGFIELD, TENNESSEE.

PLANT DUSTER.

Application filed March 15, 1924. Serial No. 699,443.

*To all whom it may concern:*

Be it known that JOHN Z. Tow and SAM OLWOVITCH, citizens of the United States, residing at Springfield, in the county of Robertson and State of Tennessee, have invented certain new and useful Improvements in Plant Dusters, of which the following is a specification.

Our invention relates to dusters or sprayers used for removing and killing insects on tobacco plants, cotton plants, and the like, by spraying them with a suitable powder.

One object of the invention is to provide a sprayer or duster of this class that is handoperated and which may be easily manipulated by one man around a field to be sprayed.

Another object of the invention is to furnish a sprayer or duster which is simple in construction and practical in use and consists of very few parts which cannot get out of order. The duster is high geared so that by turning the handle crank 45 to 60 times per minute, a fan revolution will be obtained of about 2,700 revolutions per minute.

The duster is provided with a powder container entirely separated from the air chamber and the feed of the powder into the nozzle is automatically controlled by a rotary brush which has an additional function of pulverizing any lumps of powder that may have formed in the container. The amount of powder expelled by the duster can be easily adjusted by a graduated gage so that from one pound to twenty-five pounds of powder will be sprayed on the acre of ground.

Depending on what plants are to be sprayed, different kinds of powder are used, so that for instance, when spraying cotton plants, calcium arsenate is filled into the container and for spraying tobacco, arsenate of lead is used.

In the accompanying drawings, one embodiment of the invention is illustrated, and Figure 1 is a side elevation of the duster partly in section;

Figure 2 is a fragmentary vertical section along line 2—2 of Fig. 1;

Figure 3 is another fragmentary vertical section along line 3—3 of Fig. 2; and

Figure 4 is a top plan view of the nozzle of the duster.

Reference numeral 10 represents the casing preferably made of thin, sheet metal and in which is formed a cylindrical chamber 11 for the fan 12. Near the bottom of the cylindrical chamber 11 is provided a straight neck or pipe 13 adapted to convey the air from the lower chamber to the spout 14 which is removably attached to the end of the neck 13. This spout terminates with a flattened nozzle 15 the feed opening of which is a long, narrow slit extending substantially in a horizontal direction. The side walls 16 of the nozzle 15 are diverging outwardly and the forward edge of the nozzle is rounded so that in this manner a thin, wide, spray jet is obtained. The spout has a considerable taper from its inner end 17 where it fits on the neck 13 to the inner end of the nozzle 15, as best seen in Figs. 1 and 4. In this manner the air is ejected at a considerable velocity through the nozzle where the cross sectional area of the spout is smallest. The neck 13 opens into the air chamber 11 a short distance above the bottom of the air chamber so that a shoulder 18 is formed at this point. It is claimed that by placing the neck slightly above the bottom of the air chamber 11 instead of level therewith, a considerably stronger air current is produced and ejected through the neck 13 than has heretofore been possible. This has been proved by extended tests.

Above the cylindrical air chamber 11 is formed in the casing 10 a powder container 19 placed partly above the cylindrical air chamber and partly above the neck 13 and adapted to hold six or seven pounds of powder. At the top of the container is provided a filling opening 20 adapted to be closed by a screw cap 21. In the top wall 22 of the neck 13, which at this point is preferably of square section, is formed a discharge opening 23 for the powder in the container 19. The effective area of this opening may be regulated by a slide gage 24, the handle end of which extends outside of the container wall and is guided therein as at 25. An adjusting screw and nut 26 is furnished in the top wall 22 engaging in a slot 27 in the slide gage 24 and adapted to clamp the latter in an adjusted position. At 28 is shown a scale for an index mark 29 on the slide gage 24 by means of which the adjustment of the latter is regulated.

Reference numeral 30 represents an agitator brush which is positioned so that its bristles sweep the opening 23 in the top wall 22 of the neck. This brush is keyed on a shaft 31 which when rotated revolves the brush so that the material is pulverized and prevented from clogging the amount of feed passing through the opening 23 being controlled by the brush and slide gage 24. On the left side of the casing is furnished an opening 32 large enough to pass the brush 30 through, and normally this opening is closed by a cover 33 fitting tightly therein. A shaft 31 is preferably of square cross section and has a small trunnion 34 at the left end and a long spindle 35 at its other end. Two bearing bars 36 and 37 preferably made of band iron running in substantially horizontal direction along each side of the casing are secured by wing nuts and bolts 38 to the casing. Nearest the bearing bar 36 is furnished a lock nut 57 threaded on the spindle 35 and between said nut and a crank handle 39, also threaded on the spindle is mounted a driving gear 40 which is also threaded on the spindle 35.

The fan 12 is mounted on a fan shaft 41 which is also journaled in the bearing bars 36 and 37. On the right-hand end of the fan shaft 41 which extends slightly beyond the bearing bar 36 is threaded a pinion 42, secured in place by a nut 56, said pinion meshing with an intermediary gear wheel 43, carried on a stub shaft 44, secured in the right-hand bearing bar 36. With this intermediary gear wheel 43 is rigidly connected a second pinion 45 which meshes with the drive gear 40 carried on the spindle 35 of the brush shaft 31.

It will now be evident that by turning the crank handle 39 in clockwise direction as seen in Figure 1 and indicated by arrows $z$, the brush will turn in the same direction or as indicated by arrow $x$, in Fig. 3, and revolve the fan 12 in the same direction as indicated by arrow $y$, in the same figure, through the intermediary of gear train 40, 45, 43 and 42.

Each side of the casing 10 is provided with a circular air opening 46 concentric with the axis of the fan shaft 41 for admitting air into the chamber 11. Under the left-hand bearing bar 37 is furnished a narrow slit 47 in the casing wall in order to facilitate the removal of the fan 12 from the casing.

Reference numeral 48 represents a gear shield or housing which has a depth slightly greater than the distance from the casing 10 to the outer end of the hub of the driving gear 40. This shield 48 is of such a contour and length that all the gear wheels will be covered thereby when the shield is secured to the side of the casing. This is done by means of small brackets 49 adapted to engage the inner edges of the shield and to which it is secured by means of screws 50, as best seen in Figs. 1 and 2. In the shield 48 is furnished several apertures 51 partly permitting air to enter through the side opening 46, and partly for the purpose of inspecting the proper functioning of the gears.

At 52 is shown a belt secured in suitable staples 53 at the rear end of the casing adapted for attaching the latter to the waist of the operator. A strap 53 is intended to go around one of the operator's shoulders and to hook into eyes 54 at the upper end of the casing. A handle 55 is furnished upon the left side of the casing for the operator to steady the sprayer when operating the same.

The operation of the device is as follows:

After filling the container 19 with powder and adjusting the slide gage 24 to permit the proper flow through the opening 23, the operator attaches the casing 10 to his body by means of the strap 53 and belt 52 so that the nozzle 15 is at the required height above the ground in front of him to properly spray the plants. The crank handle 39 is thereupon turned slowly when the brush 30 revolves at the same speed and causes the powder to be fed through the opening 23 to the neck 13. Should it now happen that any unbroken lumps of powder are found in the container, the same cannot pass through the opening 23 but are first ground up by the brush so that all the powder enters the neck 13 and the spout 14 in the same fine condition. As the fan 12 is rotated simultaneously with the brush, air is sucked through the opening 46 near the center of the fan and whirled around by the same in the air chamber 11 and ejected through the neck 13. As the air passes the opening 23 it sucks the powder with it and drives it at a high speed through the nozzle 15. The latter being pointed in a slightly downward direction will thus spray the powder from top to bottom of each plant.

In order to disassemble the duster, the spout 14 is first removed from the neck 13. The crank handle 39 is next detached by jerking it quickly in counter-clockwise direction. The spindle having a right-hand tread will thus permit the handle to unscrew.

The shield 48 is next removed by withdrawing the screws 50. Next the pinion 42 is taken off the fan shaft 41 by holding the pinion stationary by means of a screw driver, for instance, and unscrewing the nut 56, using a pair of pliers. The pinion 42 may then be unscrewed from the fan shaft 41 by the operator's right hand turning it in counter-clockwise direction while holding the shaft stationary by gripping the fan 12 with the left hand.

Next the cover 33 is removed and the operator's left hand inserted through the opening 32 to hold the brush 30 while the driving gear 40 is unscrewed in counter-clockwise direction from the spindle 35.

Then the side bars are removed by unscrewing the wing nuts 38. The lock nut 57 is then unscrewed from the spindle end of the brush shaft 31 and the latter pulled through the opening in the right side of the casing releasing the brush 30 which may then be withdrawn through the opening 32.

The fan shaft 41 now being loose from the bearings, the threaded end thereof is lifted up in the air chamber while one of the fan blades is permitted to partly enter the neck 13. While in this position the other blade of the fan may be pushed through the slit 47 in the casing and the fan removed.

The assembling of the parts takes place in opposite order.

Having thus described the invention, what is claimed as new is:

1. A plant duster comprising a casing having an internal dividing wall defining an air chamber and a powder chamber above and in advance of the air chamber, a spout leading from the air chamber at the bottom of the powder chamber and in communication with the powder chamber, the side walls of the casing being provided with alined openings near the bottom of the powder chamber and one side wall having a larger opening above the alined openings, a cover removably fitted in said larger opening, a shaft having a trunnion at one end and a spindle at its opposite end extending through the alined openings, said shaft being removable endwise through one of the alined openings, bearings for the spindle and the trunnion of said shaft removably secured on the outer sides of the casing, an agitator fitted on said shaft to rotate therewith and removable therefrom when the shaft is moved endwise from the casing, the agitator being removable from the casing through said larger opening, means for rotating said shaft, a fan in the air chamber, and operative connections between the fan and said shaft.

2. A plant duster comprising a casing defining an air chamber and a powder chamber above and in advance of the air chamber, a spout leading from the air chamber and communicating with the powder chamber, the casing being provided with openings in its sides at the center of the air chamber and having a slot extending radially from one of said openings, bearing bars removably secured on the sides of the casing and extending across said openings, one of said bars covering said slot, a fan shaft journaled in said bearing bars, a fan secured on said shaft and removable from the casing through said slot and the adjacent opening after removal of the bearing bars, an agitator in the powder chamber, and means on the exterior of the casing to rotate the agitator and the fan.

In testimony whereof we affix our signatures.

JOHN Z. TOW. [L. S.]
SAM OLWOVITCH. [L. S.]